United States Patent Office 3,730,887
Patented May 1, 1973

3,730,887
GRANULATING METHOD AND APPARATUS
Hidetomo Suzuki, Hidenobu Arimitsu, and Shigemasa Tanaka, Tokyo, Japan, assignors to Ebara Infilco, Kabushiki Kaisha, Tokyo-to, Japan
Continuation of abandoned application Ser. No. 843,436, July 22, 1969. This application July 14, 1971, Ser. No. 162,700
Claims priority, application Japan, Aug. 26, 1968, 43/73,461
Int. Cl. B01d 21/10; C02b 1/20
U.S. Cl. 210—45        7 Claims

ABSTRACT OF THE DISCLOSURE

The present invention proposes a granulating method and apparatus for shaping suspended solids in solution into granular solids. There is provided a solid-liquid separating tank into which a suspension containing suspensoid materials is introduced and separated into solid and liquid. Said tank is arranged such as not to form any obstacle in its interior and comprises inlet ports provided at a lower part of the tank for introducing, respectively, a suspension liquid and a high molecular compound into the tank, an outlet port provided at an upper part of the tank for discharging the liquid in the tank, and a swirling flow generating means adapted to produce a swirling flow in the liquid in said tank. It is essentially required to produce a swirling flow without forming a turbulent flow in the liquid within the tank. This swirling flow is of different nature from a so-called agitation mixture flow. The tank is free of any obstacle which may disturb the swirling flow and has a configuration best suited for forming such swirling flow. Arrangement is also made such that the suspension flows swirlingly with the high molecular compound material and is flown out in the form of slurry from the outlet provided at an upper part of the tank.

CROSS-REFERENCE TO RELATED APPLICATION

This application is a continuation of application Ser. No. 843,436, filed July 22, 1960, now abandoned.

DETAILED DESCRIPTION OF THE INVENTION

The present invention relates to a method for separating the solids from a solution and more particularly to a granulating method and apparatus for separating the suspended solids, in the form of well dehydratable granular solids, from a suspension containing suspended materials such as clays, metal minerals, metal hydroxides or organic materials.

Conventionally, for separating the suspended solids from a suspension liquid containing suspensoid, a precipitation separating method, a floating separating method or a filter separating method has been used. These methods, as well known, prove effective to separate a suspension into clean liquids and sludge containing abundance of suspended solids. However, according to these conventional methods, troublesome after-treatments involving concentration and dehydration are required to solidify this sludge. Although efforts are being made to overcome difficulties involved in these after-treatments, there is, at present, no alternative but to employ complicated steps for effecting these after-treatments. Further, in case the suspended solids in the suspension liquid are fine particles, additional difficulty is encountered in effecting concentration, and besides, sludge is produced in abundance.

This inevitably results in making even more complicated and troublesome the mechanical dehydrating treatments for the sludge, such as the treatments effected by a pressure dehydrator or a vacuum dehydrator, with resultant economical disadvantage both in efficiency and operation. Moreover, any of these dehydrators is extremely expensive and also the filter cloth used therein is subject to rapid wear. The operational control is also difficult, and there are many problems to be solved with respect to security or safety of the workers.

In still another known method, in order to expedite the process a high molecular compound (hereinafter referred to as polymer) is added, agitated and mixed in the suspension so as to separate the suspended solids in the form of large coagulated flocks from the liquid. These flocks are apparently large in size, but adhesion between the particles therein is so weak that the flocks are extremely fragile. Further, these flocks contain a large amount of liquid, or have high water content, which tends to make even more difficult the after-treatment for dehydration. Since the separated solids are simply in the form of flocks, they can not be sifted out in the water. Also, since they are fragile, it is very difficult to take them out of the solution. Working efficiency is poor, too. Even if subjected to a roll press type dehydrator, no desired dehydration can be achieved. This flock-like product, when allowed to directly flow out of the treating tank onto a flat floor, takes a fluid muddy shape. It can not therefore be piled up and is hardly dehydrated. Further, even if a vacuum or pressure filtering machine is used for dehydration of the suspension, while adding a polymer to accelerate the filtering rate, the suspended solids are simply coagulated into flock-like formation, with the filtering rate being not enhanced as expected. Thus, these conventional methods are inferior in their treating efficiency and performance and are also inconvenient and uneconomical because of the complicated and troublesome after-treatment required for dehydration.

With a view to eliminating these inconveniences and defects accompanying the conventional devices, the present invention is here presented to propose an improved method and apparatus for separating the suspended solids from a suspension liquid most effectively and rationally by using an extremely simplified treating process.

It is therefore an object of the present invention to provide a simple and economical granulating method for separating the suspended solids from a suspension liquid and obtaining them in the form of well-dehydratable granular solids.

It is another object of the present invention to provide a treating process which makes it possible to separate the suspended solids in the sludge in the form of granular solids directly from the solution and which permits easy and efficient dehydration of the sludge by adopting an extremely simple operation and apparatus.

It is still another object of the present invention to make possible the most efficient separating treatment even in case the suspended solids in the suspension are fine particles, to obtain the separated product in the form of well-dehydratable and stable granular solids without forming any flock, to permit easy sifting out operation in the water, to remarkably simplify the solid guiding out operation from the treating tank and the dehydrating operation as after-treatment, and to allow most efficient and rapid caking of the product.

It is yet another object of the present invention to provide a granulating method and a simple, inexpensive apparatus for separating the suspended material in the suspension as granular solids having high mechanical strength and good dehydratability convenient for handling.

The above objects of the present invention can be accomplished by following a granular solid-liquid separating process according to the present invention which comprises maintaining the concentration of the suspended solids in the suspension at a level preferably above 10 g./l., adding a high molecular compound in this suspension and treating it in a treating tank, giving forcible swirling to the solution to form an orientated flow while keeping the suspension concentration in said treating tank at above 30 g./l., shaping the suspended material in the suspension into well dehydratable granular solid masses which are fundamentally different in nature from the flock, and finally separating said masses from the solution.

One of the important features of the present invention resides in the obstacle-free interior construction of a tank into which the suspension liquid containing suspended material is flown and separated into solid and liquid portions. Said tank is also characterized by providing at its lower part the inlet ports for introducing the suspension solution and the high molecular compound, respectively, an outlet port provided at its upper part for discharging the solution in the tank, and a swirling flow generating means adapted to produce a swirling flow in the tank without forming any turbulent flow. The mixture solution of the suspension and the high molecular compound flows swirlingly in the tank and is discharged from the outlet in the form of slurry.

According to the process of the present invention, the suspended solids are turned into the granular solid masses which are highly dehydratable, so that, compared with the flock-like mass obtained in the conventional processes, the filtering velocity is almost tripled and the produced solid mass can be easily and efficiently dehydrated by a roll press. Also, according to the present invention, the suspended solids in the sludge can be shaped into a well dehydratable granular solid mass and directly extracted from the suspension liquid, so that the sludge may be dehydrated with extremely simple operation and apparatus and consequently an excellent cake is obtained. Thus, any inconvenience and uneconomy which accompany the conventional methods are completely cleared away, and the set objects of the invention can be accomplished positively with ease.

Further, the granular solids produced in the present process are all so strong that they can be picked out of the tank with a pincette. They are also far more advantageous, with respect to the water content, over the products obtained in the conventional methods, and also the aftertreatment is appreciably simplified.

Another feature of the present invention is that, since the suspended solids in the suspension can be directly obtained in the form of granular solid masses with low water content, they can be flown out onto and piled up on a flat floor so that water contained therein may be drained off spontaneously, and therefore they can be transported in the form of most convenient solid cakes with ease and economically.

Thus, according to the present invention, the suspended material in the liquid can be easily separated out in the form of granular solid masses having low water content, high mechanical strength, easy-to-handle convenience and well dehydratability simply by adding a high molecular compound in the suspension and by producing a swirling flow in the tank while using an extremely simple mechanism and operation. Also, the granular solids in the extracted slurry have very excellent dehydratability. The solid-liquid separating treatment in the treating tank is practiced continuously at high efficiency, and also the aftertreatment can be conducted in an extremely simplified and economical way. Granulation can also be achieved with ease and high reliability.

The invention will now be discussed in more detail by way of its preferred embodiments with reference to the accompanying drawings, in which.

Figure 1:
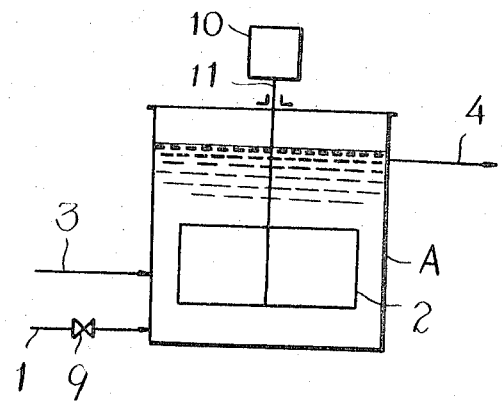
FIG. 1 is a sectional side view of the treating tank used in the present invention.
Figure 2:
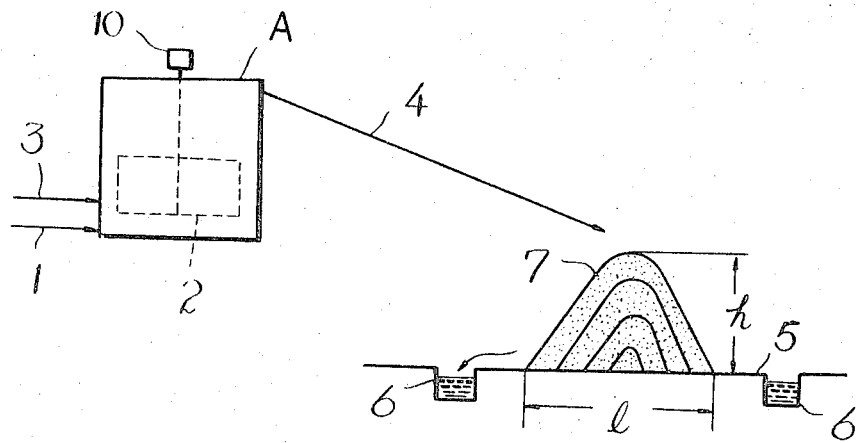
FIG. 2 is a flow sheet illustrating a mode of practice of the present invention.
Figure 3:
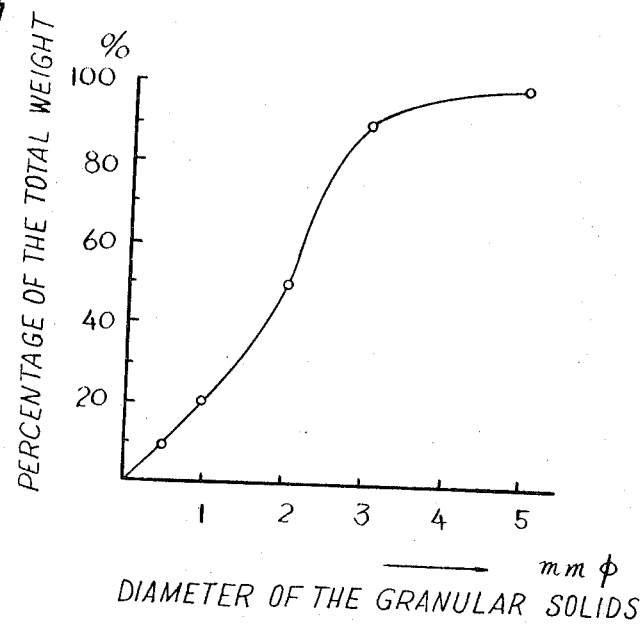
FIG. 3 is a diagram illustrating distribution of the grain sizes of the granulated solids.

Referring to FIGS. 1 to 3, there is shown a treating tank A into which raw water, or suspension, is introduced through a raw water supply pipe 1, said raw water being adjusted such that the suspension concentration is kept above 10 g./l. In the treating tank A, for example a specific agitation tank, the concentration of the suspension is kept above 50 g./l. and a large swirling flow of the suspension is produced in the tank by means of impellers 2 or by applying a jet stream. Concurrently, a suitable amount of a high molecular compound is introduced through a polymer supply pipe 3. The suspended materials in the suspension are coagulated in the treating tank A, gradually granulated by the swirling flow and finally overflown through a discharge pipe 4 in the form of well dehydratable granular solid slurry. This granulation permits easy separation of the suspension into liquid and solid fractions as well as easy dehydration.

The granular solid concentration in the suspension has close relation with production of the granular solids. Although it is found that, generally, the higher the suspended solid concentration in the suspension is, the more expedited is production of the granular solids, it should be noted, however, that when the concentration is above 500 g./l., it becomes difficult to produce desired swirling flow in the treating tank A, while a concentration of below 10 g./l. makes it hardly possible to obtain the required granular solids. Therefore, the solid concentration in the raw liquid should preferably be within the range of 10 to 500 g./l. for obtaining desired granular solid products. Also, in the present invention, a close relation exists between the granular solid concentration in the tank and production of the granular solids: if the granular solid concentration in the tank is below 30 g./l., it is hardly possible to produce the desired granular solids, but if the concentration is raised above 50 g./l. production of the granular solids becomes easy, and it is more expedited and excellent granular solid masses are obtained when the concentration is above 70 g./l. However, if the concentration is over 500 g./l., it becomes difficult to produce a swirling flow. Thus, the granular solid concentration in the tank should preferably be within the range of 30 to 500 g./l. for obtaining the desired granular solids.

The polymers used in the present invention should be suitably selected in accordance with the type of the suspension solution used. For example, anionic or non-ionic polymers are effective for a suspension containing clay in abundance, while cationic or non-ionic polymers prove successful for a suspension containing a major proportion of organic substances. Among the polymers best suited for the purpose of the present invention are included acrylamide polymers, acrylic acid polymers and vinyl polymers. It is found that a close relation is present between the granulating phenomenon and the molecular weight of the polymer used. For example, in case of using a polyacrylamide polymer, if its molecular weight is too low, although coagulation is effected, substantially no granulating action is produced. The granulating action is observed when the molecular weight is over 500,000, such action being bettered as the molecular weight is raised above 1,000,000, and the best granulation action is obtained when the molecular weight is within the range of 5,000,000 to 6,000,000. Thus, the polymer used in the present invention should have a molecular weight of over 1,000,000.

The amount of the polymer added, although varied according to the type of the suspension and of the polymer, may be within the range of about .2 to 2 kg. per ton of the suspended solids if the polymer is solid. The amount of the polymer required for rapidly precipitating the suspended solids in conventional flocculation and precipitation treatment is within the range of 0.05 to 0.1 kg. per ton of the solids. Care should be paid so that the polymer amount added is maintained within a proper range. If the added amount is below such range, there is simply produced a flock, while an excess amount of the polymer will result in producing a huge flock having high water content.

Although various means are available for producing a swirling flow in the treating tank A, most commonly used is a mechanical system using an impeller assembly 2 as shown, or a jet system where water or air stream is introduced into the tank to form a desired swirl. The treating tank A should preferably be of a cylindrical shape, since such cylindrical shape proves helpful to rotate the liquid in the tank in the same direction as rotation of the impellers 2 so as to form a large swirling flow to expedite formation of the granular solids.

In the conventional agitation tank, a baffle plate is mounted on the tank inner wall—or the tank may be square—to facilitate mixing and agitation of the liquid in the tank. But, in the apparatus according to the invention provision of such baffle plate should rather be avoided, since it may disturb the swirling flow of the liquid and may result in retarding generation of the granular solids. Particularly, if the size of such baffle plate is enlarged, although mixing and agitation in the tank may be facilitated, no satisfactory granular solids are produced, and the suspended solid materials are simply reduced into a coagulated flock. In the treating tank A shown in FIG. 1, a paddle type impeller 2 (having a diameter $d$ which is about 60 to 90% of the tank diameter) is used to form a swirling flow. The impeller should preferably be operated at an outer peripheral velocity of 0.5 to 3 m./sec. If the peripheral velocity is below 0.5 m./sec., the solids in the tank are deprived of their ability to freely waft in the liquid, while if it is over 3 m./sec., the granular solids are reduced in size and ultimately turned into small flock-like masses. The peripheral velocity may be varied according to the shape of the impeller, but preferably, in order to obtain better granular solid products, the flowing condition in the tank should be such that the swirling flow is produced under a condition where wafting of the suspended solids in the tank is near its limit.

In the process of the present invention, the apparent residence time (hereinafter referred to as RT) of the suspension supplied in the tank A varies according to the nature of the suspension. For example, in a certain sample, the granular solids are produced in 1 to 2 minutes, while another sample requires 20 to 30 minutes. Generally, the granular solids are barely produced when RT is short, but gradually come to take shape as RT is elongated. However, if RT is further extended, the condition of the granular solids is gradually deteriorated, although the real cause therefor is not known. For best results, therefore, RT should be kept within a proper range predetermined for each suspension to be used.

Figure 4:
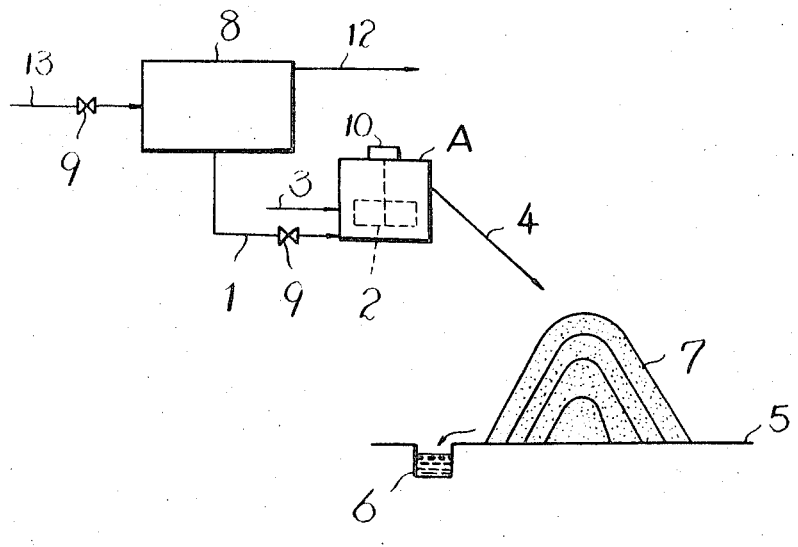
FIGS. 4 and 5 are the flow sheets illustrating other embodiments of the present invention.

FIG. 2 illustrates an embodiment where the concentration of the suspended solids in the suspension liquid is over 10 g./l. In this embodiment, the produced granular solid slurry is overflown from the treating tank A directly onto a flat concrete floor 5 and accumulated thereon in a mountainous form. The pile is allowed to stand for a short time so that water attached to the solids is spontaneously drained off and discharged through a drainage 6, while the dehydrated granular cake 7 is loaded on a truck or other transport means for the purpose of transportation. Illustrated in FIG. 4 is another embodiment where the suspended solid concentration in the suspension liquid is below 10 g./l. In this embodiment, it will be seen that a concentrating means, for example a precipitation device 8, is used to raise the concentration above 10 g./l., and then the adjusted solution is fed into the treating tank A where a swirling flow is formed.

Figure 5:
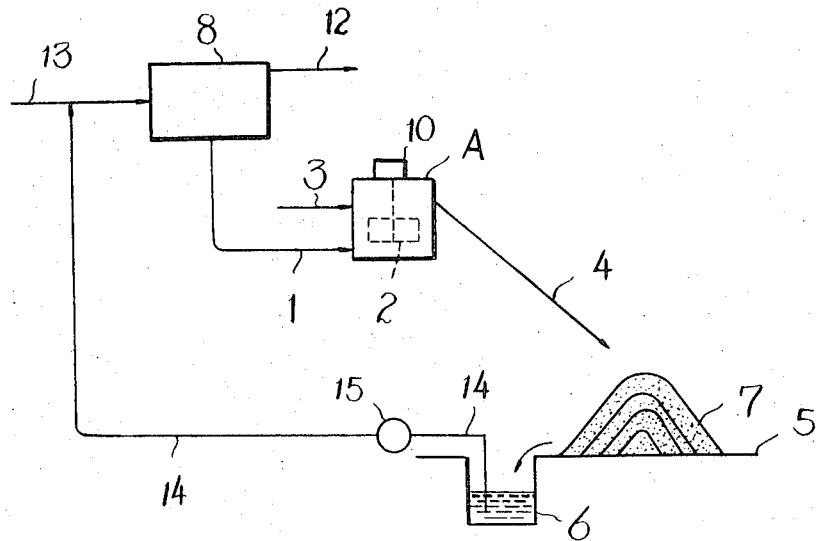

In case a minor fraction of polymer remains in the liquid from which the granular solids were separated, as in the embodiment shown in FIG. 5, this fraction is recirculated to the raw water, whereby the precipitating velocity of the suspended solids may reach 100 mm./min. or higher and effective concentration of the raw water is achieved.

In the figures, 9 denotes a control valve, 10 a driving means, 11 a rotating shaft, 12 a clean water discharge pipe, 13 a non-treated raw water supply pipe, 14 a circulation pipe, and 15 a liquid-feeding pump.

The granular solids produced according to the present invention have high mechanical strength and stability and may be effectvely sifted out in the water which could never be achieved in the conventional methods. The distribution of grain size of the sifted out solids is diagrammatically shown in FIG. 3. Although the size of the granular solids is of course affected by such factors as the type of the suspension liquid or polymer used or the operating conditions, it exerts little influence upon dehydratability of the product. For example, even if the diameter of a granular solid is below 0.5 mm.$\phi$, good dehydratability is obtained if it is a firm and solid mass, unlike a flock-like structure.

The flock-like solid masses produced in the conventional processes are usually so fragile that they can hardly be picked out of water with a pincette or the like. In contrast, the granular solid masses produced according to the process of the present invention are strong enough to be readily picked out of water wtih a pincette. As to the water content, a sample piece obtained in the present invention had a grain viscosity of 50 to 60% (wt.), as compared with the grain viscosity of about 70 to 75% (wt.) of the flock-like product obtained in a conventional process by using the same sample under the same conditions and slowly taken out of water by using a fine-mesh screen.

Figure 6:
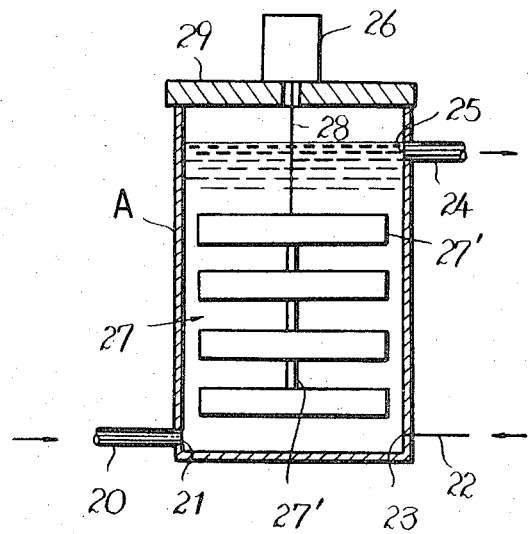
FIG. 6 is a sectional side view of another embodiment of the treating tank.

In the embodiment shown in FIG. 6, the tank A, which is of a cylindrical, polygonal-cylindrical (nearly cylindrical) or other configuration suited for forming a swirling flow, has provided near its bottom a flow inlet 21 connected to a suspension supply pipe 20 and a similar inlet port 23 connected to a high molecular compound supply pipe 22, and also has provided near its top an outlet port 25 connected to a flow discharge pipe 24.

The high molecular compound inlet port 23, instead of providing it in the tank wall, may be connected to the suspension supply pipe 20 or to the inlet 21 so that said compound will not be let into the inside of the tank A.

A most convenient means for generating a swirling flow in the tank A is to arrange the configuration of the tank such that the liquid introduced into the tank from its lower part will spontaneously produce a swirling flow as it flows upwards. Another means is to provide in the tank A the rotary vane assembly 27 adapted to be rotated by a driving means 26 so as to forcibly produce a swirling flow, as shown. This vane assembly 27 may be composed of the plate members 27' arranged in multiple stages such that each adjoining members cross with each other, or may be composed of a single plate or a paddle-like vane, and its configuration may be of any desired one, provided that it is suited for forming a swirling flow in the liquid in the tank.

In some cases, a pipe or pipes may be opened (conveniently in the centrifugal direction) into the tank and air or fluid may be forcibly ejected into the tank through said pipe or pipes by using a pump or other means so as to thereby generate a swirling flow in the tank. Also, care should be paid so that the inlet port 21 of the suspension supply pipe 20 and the inlet port 23 of the high molecular compound supply pipe 22 are opened in such a manner as best suited for generating a desired swirling flow in the tank.

In FIG. 6, 28 denotes a rotating shaft and 29 a cover member.

In this embodiment, a suspension liquid is supplied through the supply pipe 20 and introduced into the tank from the inlet port 21 near its bottom, while a pertinent quantity of a high molecular compound is carried through the supply pipe 22 and introduced into the tank from the inlet 23. The fed liquid in the tank is agitated by the rotary vane assembly 27 rotated by a driving means to produce a swirling flow. During swirling movement, the suspended materials in the liquid are gradually granulated and urged to move upwardly swirlingly with the liquid. The materials are ultimately reduced into granular solid slurry and overflown out of the tank from the outlet port 25 and discharged through the discharge pipe 24. The granular solids in the slurry have low water content and so high mechanical strength that they can be picked out of the liquid with a pincette. They can also be very easily separated. Further, they have extremely good dehydratability so that when they are piled up on a floor, spontaneous drain-off of water takes place. In addition, filtering of the solids can be performed smoothly at a high rate.

In the following will be shown some examples of the present invention.

EXAMPLE 1

A suspension having a clay-containing solid concentration of 100 g./l. was added with polyacrylamide (molecular weight being about 5,000,000) in an amount of 0.5 mg. per ton of the suspensoid and was introduced into a cylindrical tank having a diameter of 100 mm.$\phi$ and a depth of 150 mm. and equipped with a paddle-like impeller having a length of 75 mm. and a width of 40 mm. A swirling flow was produced in this tank by using said impeller under the conditions that the impeller peripheral velocity is 1.0 m./sec., the apparent RT is 3 min. and the concentration of granular solids at the granular solid generating section in the tank is 150 g./l. Obtained therefrom were the granular solids having an average grain size of 3.3 m.$\phi$ (max. 6 mm.$\phi$). The produced solids were picked out of the liquid with a pincette and their water content was determined. It was 53%.

The granular solid slurry overflown from the tank was passed onto a location on a flat concrete floor. It was piled up on said location in the manner shown in FIG. 2. When it was allowed to stand, water was drained off from the slurry mass.

Just 5 minutes after suspension of the operation, the top portion of the pile (where the slurry was falling till 5 minutes before) was subjected to analysis to determine water content of the granular solids at that portion. It was 51%. The pile or mountain of the granular solids, in the embodiment of FIG. 2, had a length of 300 mm. and a height of 250 mm. In another test, the granular solid slurry was flown out of the tank directly onto a plate so that it is piled up to a thickness of about 20 mm. and then this pile was subjected to pressing by a roll. Resultant therefrom was a cake having a water content of 43%.

In still another test, the granular solid slurry (about 100 g./l.) from the tank was vacuum-dehydrated under a given condition to know its filtering performance. It was found that the filtering rate was about 240 kg./m.² hr.

With a view to make comparison with the products obtained from a conventional method, 4 pieces of baffle plates each having a width of 10 mm. and a light of 100 mm. were mounted in an ordinary circular agitation tank and it was operated under otherwise same condition. As a result, the suspensoid solids were not granulated but formed into flock-like masses. This flock slurry, when poured onto a concrete floor, was not piled up but guttered away like mud. It was impossible to pick the flocks out of water with a pincette or to dehydrate them with a roll press. In a vacuum dehydration test conducted on this flock slurry, it was found that its filtering rate is about ⅓ (70 kg./m.² hr.) of that attained in the process of the present invention. The flocks were gathered from the slurry by using a 0.3 mm.-mesh screen to determine their water content. It was 70%.

EXAMPLE 2

A suspension having a clay-containing suspensoid concentration of 20 g./l. was added with polyacrylamide (molecular weight being about 5,000,000) in an amount of 0.7 mg. per ton of suspensoid, and the same operation as in Example 1 was repeated by using the same apparatus with no baffle plates; peripheral velocity=0.7 m./sec.). Resultant therefrom were the granular solids having an average grain size of about 2 mm. $\phi$. Their water content was 54%. The produced slurry could be piled up in a mountainous form. The concentration of granular solids in the tank at that time was 140 g./l. 100 cc. of liquid separated from the granular solids was added to 300 cc. of raw water and precipitation was effected in a cylinder. The suspensoid precipitated at a rate of more than 100 mm./min., thus remarkably promoting concentration of the raw water.

In another test, the shape of the impeller was deformed such as to hinder accumulation of the suspended solids in the tank, whereby the concentration of granular solids in the tank was reduced below 30 g./l. and the solids overflown from the tank were turned into flock-like masses which were sludgy on the floor.

EXAMPLE 3

A suspension having about 50 g./l. concentration of suspensoid containing cation, aluminium hydroxide and an organic substance was subjected to the same apparatus (having no baffle plates) as used in Example 1, and a swirling flow was produced in the suspension under the following operational conditions: peripheral velocity=0.8 m./sec., RT=3 min., adding rate of polyacrylic soda (molecular weight about 2,000,000)=0.75 mg./g., and concentration of granular solids in the tank=100 to 120 g./l. As a result, the granular solids having an average grain size of about 3 mm. $\phi$ were produced. They could be piled up on the floor. The "1" and "h" in FIG. 2 were 300 mm. and 200 mm., respectively, in this case. The water content of the granular solids was about 60%.

What is claimed is:

1. A continuous granulating method for treating suspensions containing suspended materials of clays, metal minerals, metal hydroxides or suspended organic materials, which comprises controlling the concentration of solids suspended in the suspension to a concentration between 10 g./l. and 500 g./l.; feeding said suspension into a cylindrical treating tank; continuously adding a flocculating agent selected from the group consisting of high molecular weight polyacrylamide, partially hydrolyzed acrylamide, and high molecular weight polyacrylic soda to this suspension in an amount higher than 0.2 g./kg. of the suspended solids in said treating tank to maintain the concentration of granular solids in the tank between 30 g./l. and 500 g./l.; swirling said solution in non-turbulent flow in said tank at an outer peripheral velocity of between 0.5 m./sec. and 3 m./sec. thereby shaping the suspended solids in the liquid into granular solids and finally substantially separating the granular solids from the liquid.

2. A granulating method according to claim 1, including the preliminary step of supplying the liquid from which the granular solids have been separated into the untreated suspension for treatment thereby to expedite precipitation of the suspended solids in the liquid so as to control the concentration of suspended solids to a concentration between 10 g./l. and 500 g./l.

3. A granulating method as defined in claim 1, wherein said suspension is introduced into said tank proximate the bottom thereof and at an angle such as to promote swirling of said suspension within said tank.

4. A granulating method as defined in claim 1, wherein said suspension consists mostly of clays and inorganic materials.

5. A granulating method as defined in claim 1, wherein said suspension consists mostly of organic material.

6. A granulating method as defined in claim 1, wherein the average retention time of the solids in said treating tank is between 1 minute and 30 minutes.

7. A granulating method as defined in claim 1, wherein turbulent flow is avoided by the use of a tank for said granulation which is free of obstruction or protrusions into said tank and wherein paddles positioned in said tank rotate at a rate such that their peripheral velocities lies between 0.5 m./sec. and 3 m./sec.

References Cited

UNITED STATES PATENTS

| | | | |
|---|---|---|---|
| 3,414,513 | 12/1968 | Buhl et al. | 210—54 |
| 3,578,586 | 5/1971 | Gal et al. | 210—49 |
| 2,431,478 | 11/1947 | Hill | 210—208 X |
| 2,767,847 | 10/1956 | Russell et al. | 210—219 X |
| 3,247,105 | 4/1966 | Gustafson | 210—46 |
| 3,259,569 | 7/1966 | Priesing et al. | 210—54 X |
| 3,463,726 | 8/1969 | Schulte | 210—60 X |
| 3,479,283 | 11/1969 | Harrison et al. | 210—54 |

SAMIH N. ZAHARNA, Primary Examiner

T. G. WYSE, Assistant Examiner

U.S. Cl. X.R.

210—49

UNITED STATES PATENT OFFICE
CERTIFICATE OF CORRECTION

Patent No. 3,730,887   Dated May 1, 1973

Inventor(s) Hidetomo Suzuki, Hidenobu Arimitsu & Shigemasa Tanaka

It is certified that error appears in the above-identified patent and that said Letters Patent are hereby corrected as shown below:

In the Patent specification:

(1) Column 4, last line: change "within the range of about .2 to 2 kg. per ton of" to -- within the range of about 0.2 to 2kg per ton of --.

(2) Column 7, lines 30 & 31 (in the Example) change:

"in an amount of 0.5 mg. per ton of" to

-- in an amount of 0.5 mg. per gram of --

(3) Column 8, lines 12 (in the Example 2): change

" of 0.7 mg per ton of suspensoid" to

-- of 0.7 mg. per gram of suspensoid --.

Signed and sealed this 10th day of June 1975.

(SEAL)
Attest:

RUTH C. MASON
Attesting Officer

C. MARSHALL DANN
Commissioner of Patents
and Trademarks